United States Patent [19]

Lefevre et al.

[11] 4,328,619

[45] May 11, 1982

[54] LENGTH AND ANGLE GAUGE

[76] Inventors: William Lefevre, 46 Roland St., Newton Highlands, Mass. 02161; Robert P. Darlington, 8 Black Horse Dr., Acton, Mass. 01720

[21] Appl. No.: 198,626

[22] Filed: Oct. 20, 1980

[51] Int. Cl.³ .......................... G01B 3/08; G01B 3/56
[52] U.S. Cl. ....................................... 33/161; 33/461
[58] Field of Search .................. 33/161, 459-462, 33/464, 473, 419, 174 G, 296

[56] References Cited

U.S. PATENT DOCUMENTS

| | | | |
|---|---|---|---|
| 648,576 | 5/1900 | Taylor | 33/161 |
| 847,720 | 3/1907 | Barbo | 33/462 |
| 1,253,096 | 1/1918 | Preston | 33/461 |
| 1,324,624 | 12/1919 | Seay | 33/460 |
| 1,336,102 | 4/1920 | Smith | 33/459 |
| 1,341,435 | 5/1920 | Olsen | 33/495 |
| 2,952,076 | 9/1960 | Gross | 33/161 X |
| 3,190,008 | 6/1965 | Weiss | 33/161 |
| 3,492,737 | 2/1970 | Swanson | 33/161 |

FOREIGN PATENT DOCUMENTS 374261  6/1932  United Kingdom ................. 33/161

*Primary Examiner*—Harry N. Haroian
*Attorney, Agent, or Firm*—Joseph S. Iandiorio

[57] ABSTRACT

A length and angle gauge including first and second longitudinally aligned and slidably engaging ruler sections; means for releasably securing the sections; each section having an inner end and an outer end, one of the sections bearing a length scale starting at the outer end and ascending toward the inner end, the other section bearing a continuation of the length scale with the scale value for the minimum retracted length of the gauge starting at the outer end and ascending toward the inner end; a rotatable arm located at the outer end of each section and having a slanted surface; means for rotatably mounting the arm to the outer end; means for releasably securing the arm to the outer end; and retraction means for enabling the arm to be withdrawn within the outer end.

1 Claim, 5 Drawing Figures

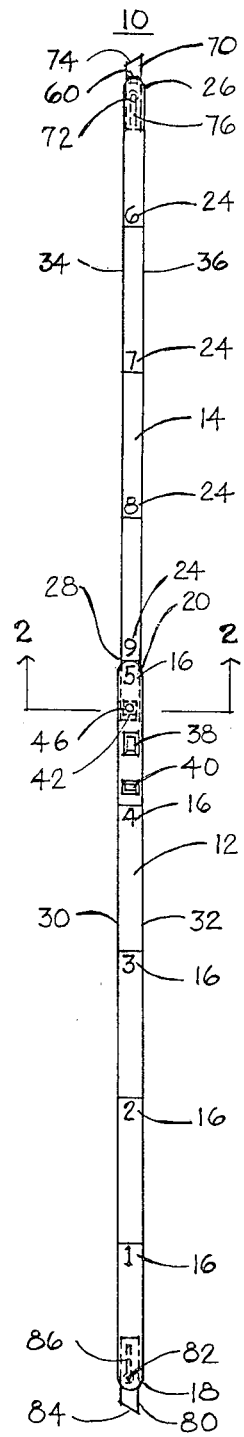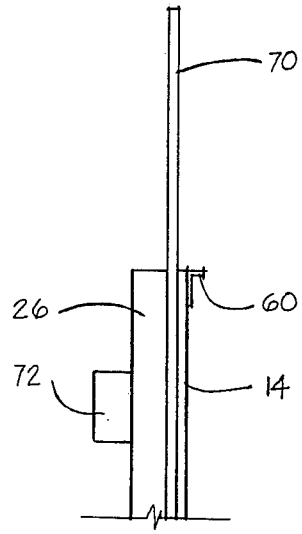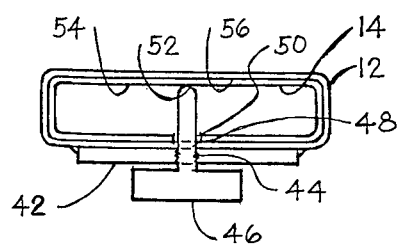
FIG. 1
FIG. 3
FIG. 2

LENGTH AND ANGLE GAUGE

FIELD OF INVENTION

This invention relates to a length and angle gauge for measuring and recording lengths and angles.

BACKGROUND OF INVENTION

It is often necessary to measure distances of a length where one cannot control the ruler and so easily see the significant portion of the scale. Further, it frequently is required to determine the relative angles between two surfaces as well as the distance and to record them at least temporarily.

SUMMARY OF INVENTION

It is therefore an object of this invention to provide an extensible length and angle gauge for simply and easily measuring the distance between two points and-/or their relative angles.

It is a further object of this invention to provide such a gauge in which the length scale can be read near its midpoint.

It is a further object of this invention to provide such a gauge which can be adjusted to accommodate surfaces of various angles relative to one another.

The invention features a length and angle gauge which has first and second ruler sections that are longitudinally aligned and slidably engaged with each other. There are means for releasably securing the sections. Each section has an inner end and an outer end; one of the sections carries a length scale starting at the outer end and ascending toward the inner end. There is a continuation of the length scale with the scale value for the minimum retracted length of the gauge beginning at the outer end and ascending toward the inner end. There is a rotatable arm located at the outer end of each section, and the arm has a slanted surface. There are means for rotatably mounting the arm to the outer end and also for releasably securing the arm to the outer end. Retraction means enable the arm to be withdrawn within the outer end.

At least one of the first and second ruler sections may include a hollow tube which is larger than the other section for slidably receiving the other section. The hollow tube may be generally rectangular and may include three sides and at least a part of a fourth. The other section may also be rectangular.

The means for releasably securing the two sections together may include a screw threadably mounted in the hollow tube and having a bearing surface for engaging with the other of the sections. A slot in the other of the sections accommodates the screw when the sections are slid relative to one another. The means for rotatably mounting the arms may include a stud on the arm, and the means for releasably securing the arm may include a second screw, a hole in the outer end for receiving the screw, and threads in the stud for engaging the screw.

The hole in the outer end for receiving the second screw may be elongate, and together with the second screw may comprise the retraction means.

There may be a pull hook mounted at one or both of the outer ends of the sections, and an edge on each section may be formed as a straight edge. Level indicating means may be provided as an aid in properly positioning the gauge horizontally and/or vertically.

DISCLOSURE OF PREFERRED EMBODIMENT

Other objects, features and advantages will occur from the following description of a preferred embodiment and the accompanying drawings, in which:

FIG. 1 is a front elevational view of the gauge of this invention in the fully extended position;

FIG. 2 is a cross-section taken along line 2—2 of FIG. 1;

FIG. 3 is an enlarged side view of the upper end of the gauge of FIG. 1;

Figures 4, 5:
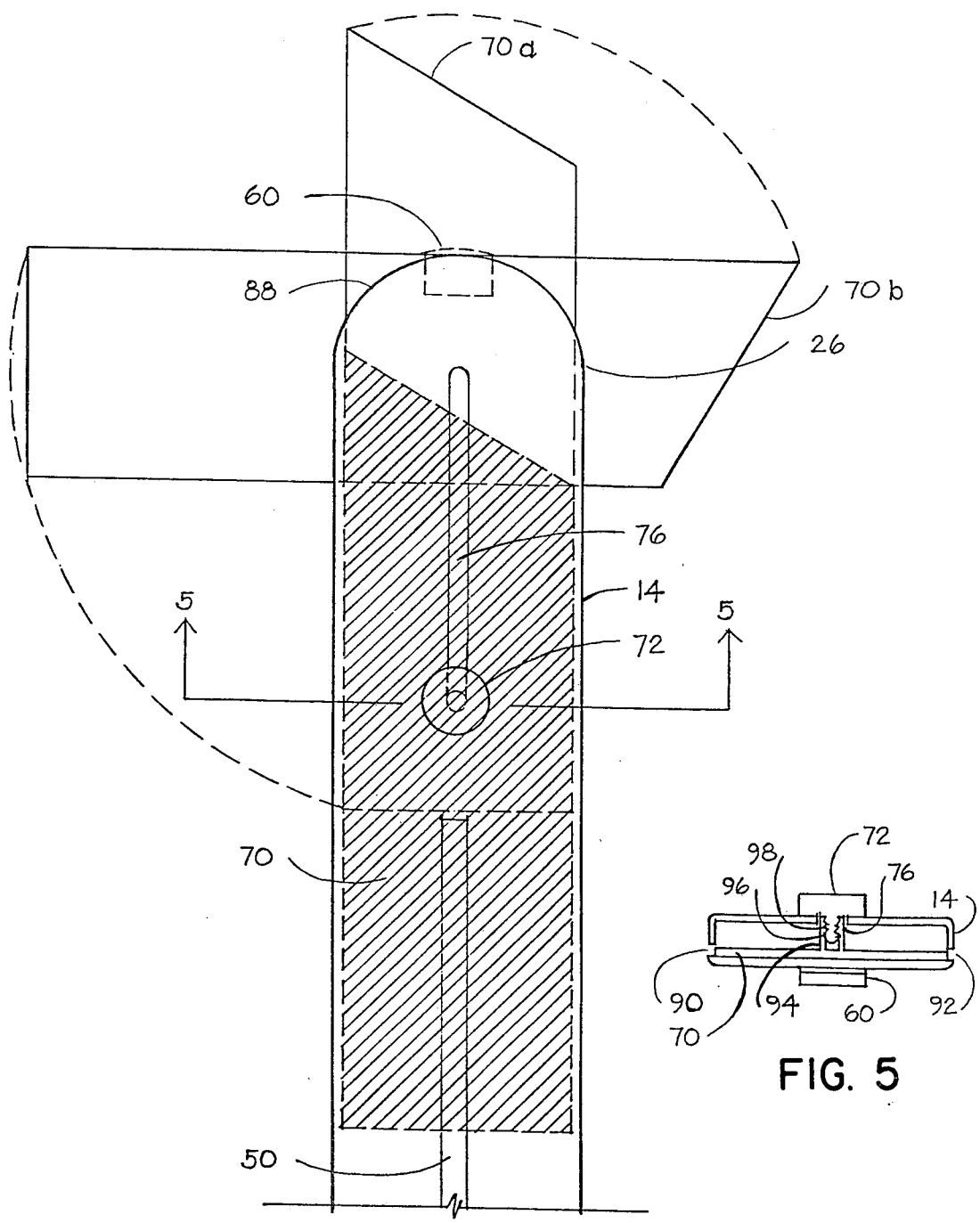
FIG. 4 is an enlarged detailed view of an arm at the outer end of one of the sections.
FIG. 5 is a cross section along line 5—5 of FIG. 4.

The invention may be accomplished with a length and angle gauge having first and second longitudinally aligned and slidably engageable ruler sections. The sections are typically hollow tubes, and one telescopes inside of the other. There are means for releasably securing the sections together to lock them in any particular position. The means may include a screw mounted on the outer section which passes through a slot in the inner section and presses on the wall thereof. Typically the outer section has a scale imprinted on it beginning at its outer end and ascending toward its inner end, and the inner section has an inverted scale printed on it which is a continuation of the scale on the outer section, such that the scale value for the minimum retracted length of the gauge begins at the outer end of that inner section and extends toward the inner end of the inner section.

There is a rotatable arm located at the outer end of each section which has a slanted surface for accommodating surfaces of various angles. There are means for rotatably mounting the arm to the outer end, such as a stud on the arm. The stud is internally threaded and engages a screw, which passes through a hole in the outer end of the ruler section: the screw acts to releasably secure the arm to the outer end. The hole may be elongated in the nature of a slot, so that in combination with the screw it forms a retraction means by which the arm may be extended and retracted within the outer end of the section.

The ruler sections may include one or more measuring scales, e.g. English or metric. A pull hook may be provided at either or both of the outer ends for engaging with the ends of items to be measured. A level bubble may be mounted on the gauge to indicate vertical or horizontal orientation. Various materials, such as metals or plastic, may be used to fabricate the gauge, and the ruler sections may take various forms, i.e. partially or fully closed tubing, channels, and the like.

There is shown in FIG. 1 a length and angle gauge 10 according to this invention which includes ruler section 12 in which is slidably movable ruler section 14. Ruler section 12 includes a scale from zero to five feet, as indicated by indicia 16 for the one, two, three, four, and five foot marks which extend from the outer end 18 to the inner end 20 of ruler section 12. Ruler section 14 includes indicia 24 and includes representations of six, seven, eight and nine feet, which ascend from the outer end 26 to the inner end 28 of ruler section 14. In FIG. 1, gauge 10 is extended to its fully open nine-foot length. Both edges 30, 32 of section 12 and 34, 36 of section 14 are straight edges and may be used as straight edge guides. Vertical level bubble 38 and horizontal level bubble 40 are provided to aid in orientation of gauge 10 in vertical and horizontal positions, respectively.

Mounted near the inner end 20 of section 12 is a plate 42 which includes a threaded hole 44, FIG. 2, that receives knurled thumb wheel screw 46 which passes through hole 48 in ruler section 12 and then through slot 50 in ruler section 14, so that the end 52 of screw 46 presses against the inner wall 54 of ruler section 14 and forces it to bear firmly against the inner wall 56 of ruler section 12 and increase the friction therebetween to securely lock sections 12 and 14 in a desired position.

A pull hook 60, FIG. 3, is mounted at the outer end 26 of ruler section 14 for gripping the end of objects to be measured by the gauge. A similar pull hook, not shown, may be mounted at the outer end 18 of ruler section 12.

Rotatable arm 70 may be mounted at the outer end 26 of ruler section 14 by means of thumb wheel screw 72. When extended, as shown in FIG. 3, the slanted surface 74, FIG. 1, of arm 70 may be rotated to accommodate the orientation of a surface which defines a limit of the distance to be measured. When thumb screw 72 is loosened arm 70 may be advanced or retracted along slot 76 and may also be rotated to accommodate slanted surface 74 to any particular angle. A similar arm 80 is mounted to outer end 18 of ruler section 12 by means of thumb screw 82, which when loosened permits advance and retraction of arm 80 along slot 86 and also enables rotation of arm 80 to accommodate slanted surface 84 to any necessary angle.

Arm 70 is shown crosshatched in the fully retracted position wholly within the curved profile 88 of outer end 26 in FIG. 4, with thumb screw 72 resting at the bottom of slot 76. By loosening thumb wheel 72, arm 70 may be slid up fully or part way as shown by the arm in position 70a, and while thumb screw 72 is loose arm 70 may be rotated to assume any desired position, for example as illustrated by arm position 70b. Slots 90, 92, FIG. 5, are provided in ruler section 14 to allow arm 70 to rotate out of the position which is aligned with ruler section 14. Arm 70 includes a stud 94 which has internal threads 96 that engage with external threads 98 of thumb screw 72. Thus when loosened, thumb screw 72 in conjunction with stud 94 provides a pivot about which arm 70 can rotate, and when tightened, thumb screw 72 firmly squeezes the portion of ruler section 14 against the top of stud 94 to prevent movement of the pieces.

Other embodiments will occur to those skilled in the art and are within the following claims:

What is claimed is:

1. A length and angle gauge comprising:

first and second longitudinally aligned and slidably engaging ruler sections; at least one of said first and second ruler sections including a hollow tube larger than the other section for slidably receiving the other said section; said hollow tube being generally rectangular and including three sides and at least part of a fourth; and said other section also being generally rectangular;

means for releasably securing said sections including a first screw threadably mounted in said hollow tube and having a bearing surface for engaging with the other of said sections and a slot in the other of said sections for accommodating said screw as said sections are slid relative to one another;

each section having an inner end and an outer end, one of said sections bearing a length scale starting at the outer end and ascending toward the inner end, the other section bearing a continuation of the length scale beginning with the scale value for the minimum retracted length of the gauge at the outer end and ascending toward the inner end;

a rotatable arm located at the outer end of each section and having a slanted surface;

means for rotatably mounting said arm to said outer end including a stud on each arm;

means for releasably securing said arm to said outer end including a second screw, an elongate hole in said outer end for receiving said second screw, and threads in said stud for engaging said second screw; and retraction means including said second screw for enabling said arm to be longitudinally withdrawn within said outer end.

* * * * *